Patented Sept. 21, 1937

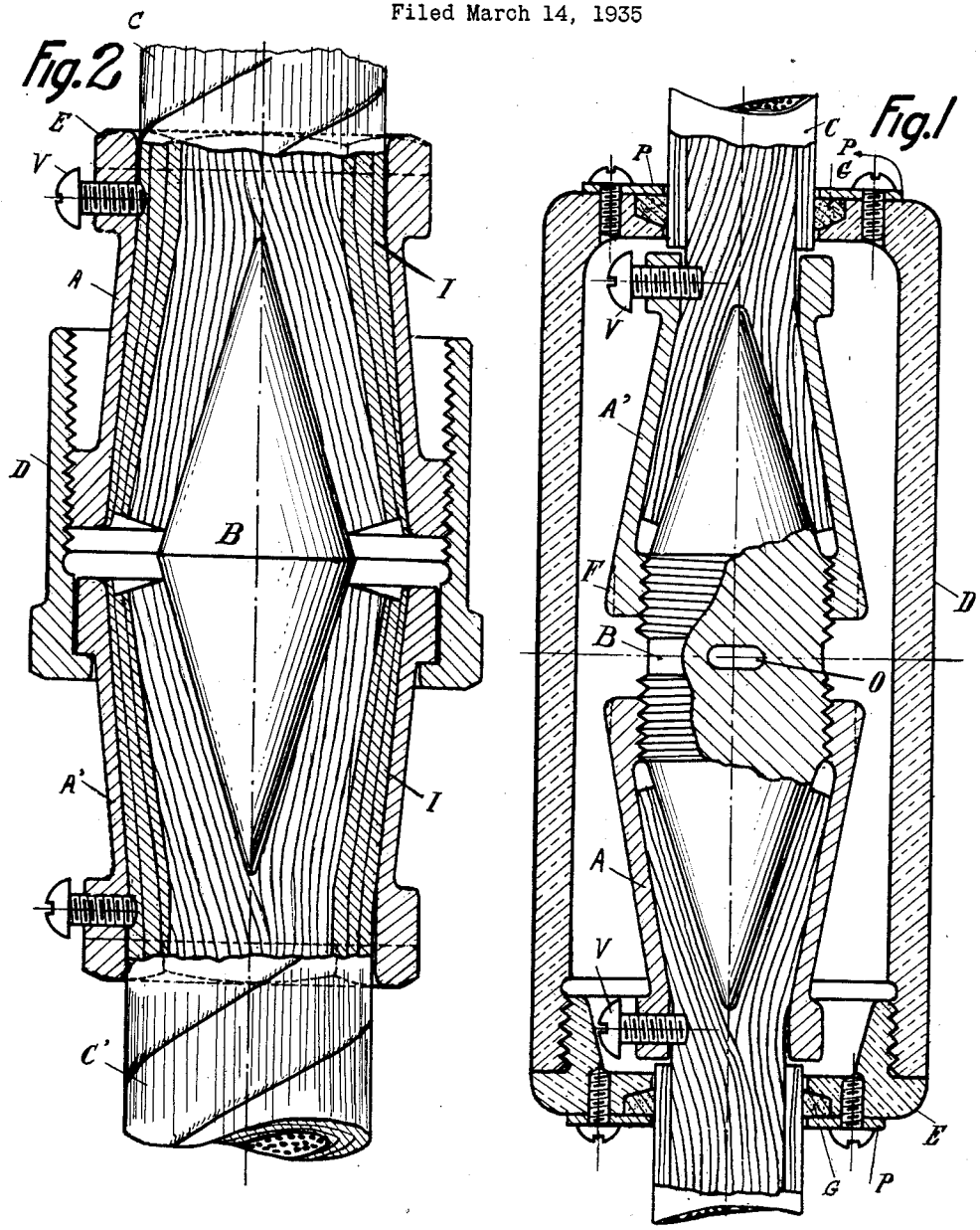

2,093,403

UNITED STATES PATENT OFFICE 2,093,403

CABLE CONNECTER AND JUNCTION WITH CONICAL CONTACT

Maurice Antoine Sertillange, Brest, France

Application March 14, 1935, Serial No. 11,060

1 Claim. (Cl. 173—268)

This invention comprises improvements applicable to cable connecters for twisted-core cables formed from one metal.

The connection of cables is generally effected by terminals or thimbles with mechanical clamping means or with soldered contacts. The known methods almost always have disadvantages such as taking a long time and being complicated in assembly owing to the soldering or of producing a potential drop in the circuit in which they are placed which in time leads to heating which may become dangerous, particularly if these joints are placed in junction boxes filled with resin or other insulating material. The same defects are encountered with connecters used at high potentials.

The present invention has for its object a connecter system with conical contacts which has the following advantages: it is simple and quick to assemble, this operation being limited to the operation of a screw, it has a very large contact surface thereby preventing substantial potential drop in the connecter (tests having shown that the drop in the connecter is much less than that for the same length of cable), it has great mechanical strength and is incapable of becoming detached, it is perfectly insulated and fluid-tight and it can be fitted to cables of different sections without damaging the contacts.

A cable connecter according to the present invention comprises a double-coned member with which a pair of female coned members coact to clamp the cables, means for fixing said female members preliminarily to the ends of the cables to be connected, screw means for drawing said female members against the double-coned member without rotating them relatively to the cable ends, and means for insulating the outer parts of the connecter from the live circuit.

The accompanying drawing serves to illustrate two embodiments of the invention, each drawing being a cross sectional view.

Supposing firstly, and with reference to Fig. 1, that the cables C and C¹ are to be connected together. Their ends are first bared for a suitable length and are then inserted in the nuts A and A¹. The cables are maintained centered by clamping the screws V arranged in the neck of each nut. The coned extremities of the screwed member B are then inserted into the core of each cable and then member B is rotated by means of a bar inserted through the hole O. The nuts A and A¹ are held during the clamping operation by a key fixed in the slots F. The extremities of the cables C—C¹ are clamped between the nuts A and A¹ and the cones of the screwed member B. The assembly is made so that it cannot be disconnected, by the provision of the opposite threads of the screwed member. Insulation and fluid-tightness of the connecter is obtained by the insulating sleeve D, which is put into place after the positioning of the connecter. It embodies at one of its extremities a nut E and embodies two stuffing boxes G. The cover D may, in certain cases be filled with resin.

According to Fig. 2, the bi-conical element is not threaded and this embodiment permits the insulating material itself of the cables to be used for insulating the connecter.

Fluid-tightness is obtained by the clamping of the insulation of the cables against the inner surface of the female cones and this tightness may be increased by a ring of rubber on the extremity of the cables. The time taken in assembling the connecter is then very much reduced since the baring of the ends of the cables to be connected need not be performed and this has been found to be a very lengthy and difficult operation. It is sufficient to utilize the connecter if the ends of the cables to be connected have a clean section. Finally, the connecter may be formed entirely of metal which will ensure it having great strength while permitting perfect insulation at the junction of the cables. In certain cases the insulation may be assisted by conical tubes of flexible insulating material, placed between the cables and the female cones or by a coating of plastic insulating material on the inner surface of these latter.

As shown in Fig. 2, the assembly is effected in the following way: assuming that cables C and C¹ with metal sheaths are to be connected. Their ends are cut perpendicular to the axis and then each extremity is introduced into the cones A and A¹. Then these cones are fixed to the cables by the centering screws V. The double cone B is then placed in the axis of the cables until these are securely clamped against the inner surfaces of the cones A and A¹. To facilitate penetration of the cone, the extremity of the cables could be opened by a form tool. During the clamping of the cable the armouring of the cable will recede by reason of the increase of diameter produced by the penetration of the double cone into the cable ends and the insulation I will be applied against the inner faces of the cones, thus producing the fluid-tightness of the connecter which, in certain cases, will be increased by rubber rings. To facilitate the assembly, the cones A and A¹ embody six flats E at their extremity.

What I claim and desire to secure by Letters Patent of the United States of America is:—

A cable connecter for twisted-core cables which latter are formed from one metal only, comprising a double-coned member adapted to be inserted into the ends of the cable, a pair of female members adapted to clamp the cable ends against said double-coned member, means for urging said female members towards one another to perform the aforesaid clamping action, radially positioned screws for preliminarily fixng said female members to the cable cores, and means for insulating the outside of the connecter from the electric circuit.

MAURICE ANTOINE SERTILLANGE.